United States Patent [19]
March et al.

[11] 3,883,433
[45] May 13, 1975

[54] COLLECTION AND RECOVERY SYSTEM FOR OIL SPILLS

[75] Inventors: Frank Adams March; Louis Stanislaus Brown, both of Reston, Va.

[73] Assignee: Ocean Systems, Inc., Reston, Va.

[22] Filed: Sept. 20, 1973

[21] Appl. No.: 399,339

Related U.S. Application Data

[63] Continuation-in-part of Ser. No. 269,725, July 7, 1972, abandoned.

[30] Foreign Application Priority Data

July 4, 1973 Netherlands.................... 7309366

[52] U.S. Cl........................... 210/242; 210/DIG. 21
[51] Int. Cl........................................... E02b 15/04
[58] Field of Search............... 210/83, 242, DIG. 21; 61/1 F

[56] References Cited
UNITED STATES PATENTS

| | | | |
|---|---|---|---|
| 2,497,177 | 2/1950 | McClintock et al. | 210/242 |
| 3,650,406 | 3/1972 | Brown et al. | 210/242 |
| 3,686,870 | 8/1972 | Blomberg | 61/1 F |
| 3,708,982 | 1/1973 | Blockwick | 61/1 F |
| 3,726,406 | 4/1973 | Damberger | 210/242 |
| 3,768,656 | 10/1973 | Nugent | 210/DIG. 21 |
| 3,771,662 | 11/1973 | Muramatsu et al. | 210/DIG. 21 |

*Primary Examiner*—Theodore A. Granger

[57] ABSTRACT

Apparatus for collecting spilled oil with a plurality of rigid weir-plates disposed along a primary weir and supported by discrete weir-plate floats, each weir-plate having a weir opening, the weir-plates spaced from each other along the primary weir and connected to one another by flexible sheet. Embodiments of the invention additionally feature supporting the rear edge of the basin by discrete secondary floats spaced along the rear edge of the basin and connected by flexible sheet; stiffeners connected between the primary weir and the secondary floats; a plurality of secondary weirs supported on the secondary floats each secondary weir having a lip positioned beneath its associated secondary float; weir plates affixed to elongated weir plate floats at an angle so that they float stably with their lower edges aft of their upper edges; a perforation in the bottom of the basin; a tension line rigged foreward of the primary weir and a plurality of bridles running between the tension line and the primary weir; bridles proportioned in length to deploy the primary weir along a parabolic line; a plurality of discrete floats along the primary weir intermediate to said weir plates and connected thereto by flexible sheet; floats made of a semiflexible closed cell foam coated with an elastomer outer coating; rigid stiffening plates affixed to the intermediate floats and attached to the forward edge of the basin, the stiffening plates extending downward from said intermediate floats to maintain said basin bottom at a predetermined depth in the water.

11 Claims, 5 Drawing Figures

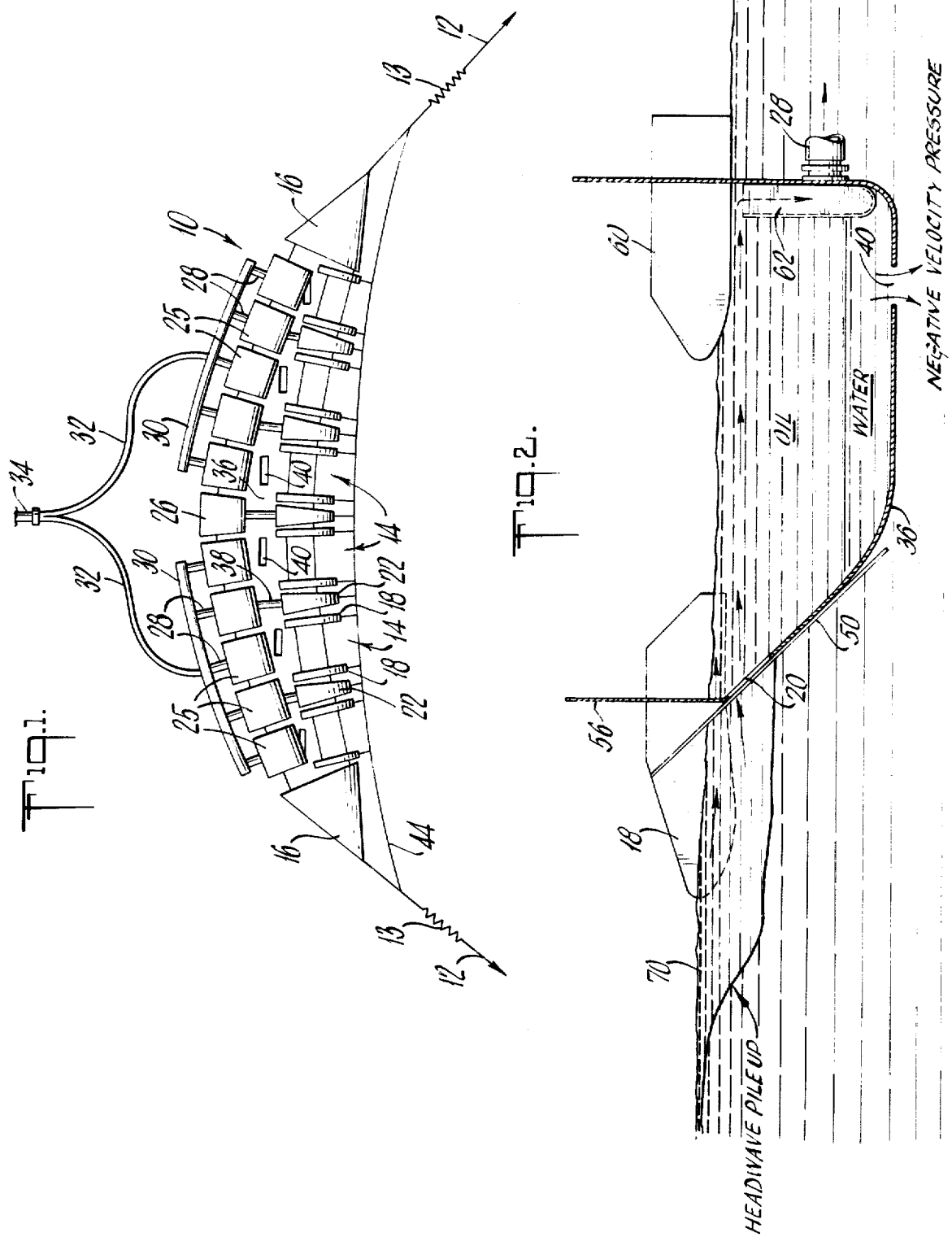

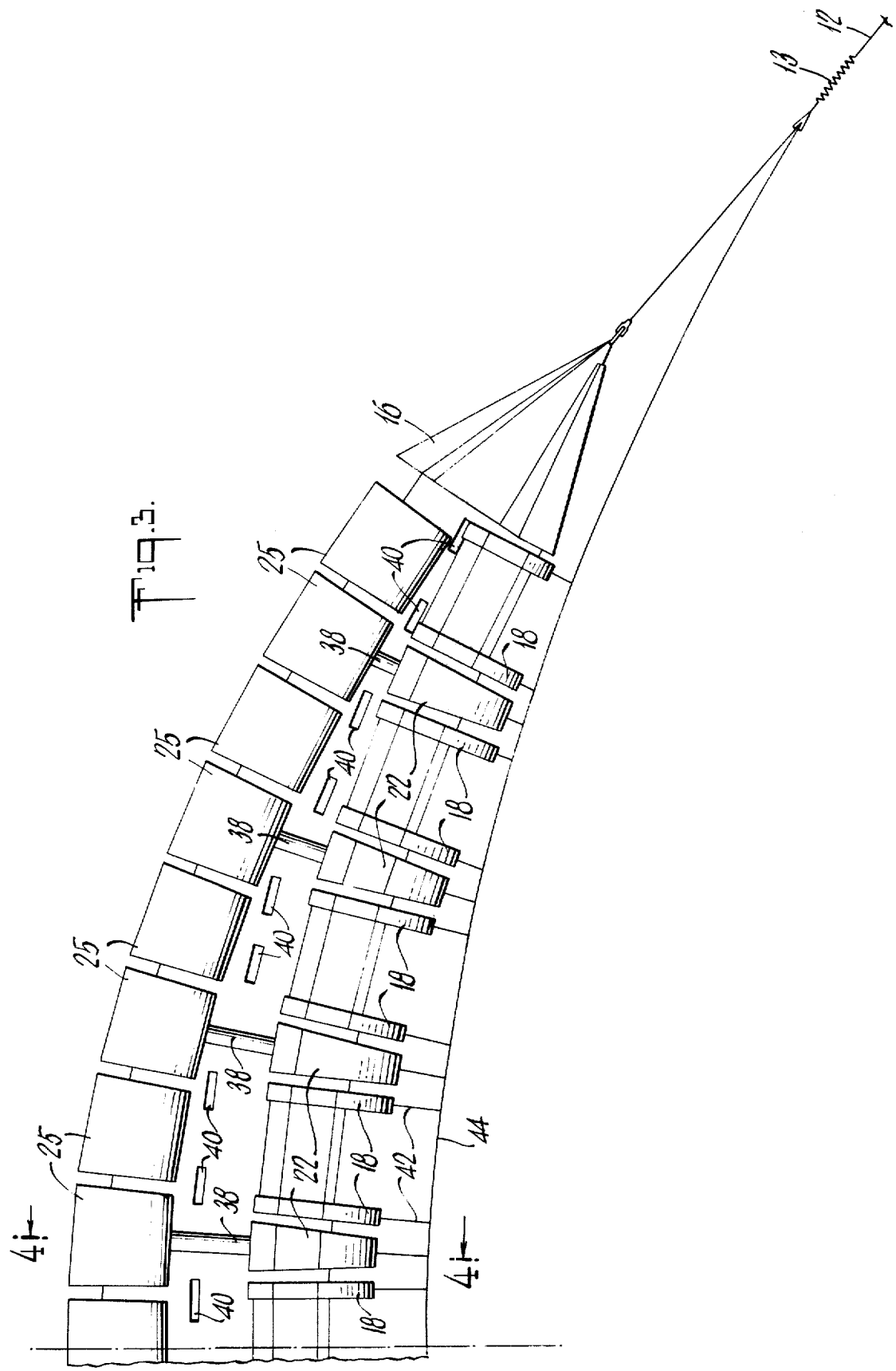

COLLECTION AND RECOVERY SYSTEM FOR OIL SPILLS

This is a continuation-in-part of application Ser. No. 269,725 filed July 7, 1972 now abandoned.

BACKGROUND OF THE INVENTION

This invention relates to an anti-pollution system for the collection and recovery of an immiscible liquid of low density, such as oil, from the surface of a body of liquid of higher density, such as water.

Spilled oil is difficult to remove from the sea because it not only spreads rapidly but undergoes changes with time due to evaporation and emulsification, rendering the oil as time passes more dense and therefore more difficult to collect. The weathering of the oil is related to the condition of the surrounding sea, temperature, and oil type. Hence, removal of oil from an oil spill, to be effective, must be rapid. From an ecological standpoint, all that is required is the speedy removal of the oil from the surface of the sea. All prior art systems are designed with this as their fundamental objective. Although the removed liquid mixture of oil and water may be fed through separation equipment ro reclaim the oil as a useful product, it is not economically practical to do so. Hence, a system which fulfills the ecological requirements and at the same time performs a substantial separation of the oil from the water is far more desirable.

SUMMARY OF THE INVENTION

The invention features a plurality of rigid weir-plates disposed along a primary weir and supported by discrete weir-plate floats, each weir-plate having a weir opening, the weir-plates spaced from each other along the primary weir and connected to one another by flexible sheet, thereby making the primary weir conformable to wave motion in the body of water. Embodiments of the invention additionally feature supporting the rear edge of the basin by discrete secondary floats spaced along the rear edge of the basin and connected by flexible sheet; stiffeners connected between the primary weir and the secondary floats, thereby maintaining the spacing therebetween; a plurality of secondary weirs supported on the secondary floats, each secondary weir having a lip positioned beneath its associated secondary float, thereby admitting fluid from the upper layer of fluid within the basin to an oil discharge without air entrainment; weir plates affixed to elongated weir-plate floats at an angle so that they float stably with their lower edges aft of their upper edges, thereby causing as the apparatus moves over the body of water a thickening of the oil ahead of the weir plate and a reduced pressure beneath said basin; a perforation in the bottom of the basin, whereby water is discharged from the basin at a low pressure region; a tension line rigged foreward of the primary weir and a plurality of bridles running between the tension line and the primary weir, whereby the primary weir may be towed over the body of water with the preponderance of towing forces carried by the tension line; bridles proportioned in length to deploy the primary weir along a parabolic line; a plurality of discrete floats along the primary weir intermediate to said weir plates and connected thereto by flexible sheet; floats made of a semiflexible closed cell foam coated with an elastomer outer coating; rigid stiffening plates affixed to the intermediate floats and attached to the forward edge of said basin, the stiffening plates extending downward from said intermediate floats.

The apparatus of the invention performs a substantial separation of the oil from the water before the oil is discharged for delivery to a pick-up station or accompanying vessel and is highly conformable to wave motion so that oil escape is minimized. The discharged oil is in an essentially reclaimed state having an average measured purity, relative to the pre-spill purity, of over 95 percent and in some cases over 99 percent.

Other features and advantages of the present invention will become apparent from the following detailed description when read in connection with the accompanying drawings.

BRIEF DESCRIPTION OF THE DRAWING

FIG. 1 is a diagrammatic showing of the system of the present invention;

FIG. 2 is a schematic showing illustrating the principles of operation of the system of FIG. 1;

FIG. 3 is an enlarged diagrammatic showing of part of a higher capacity version of the system of FIG. 1;

DESCRIPTION OF PREFERRED EMBODIMENT

Figure 4:
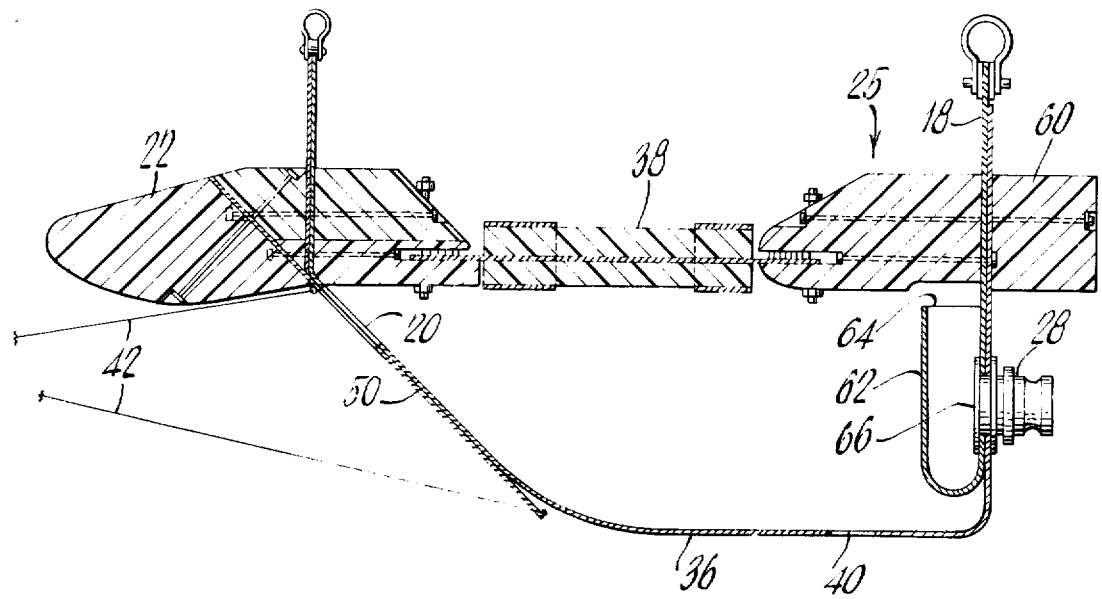
FIG. 4 is a cross-section of the oil collection basin of the present invention taken along lines 4—4 of FIG. 3.

The system 10 as shown in FIG. 1 is adapted to be towed by means of towlines 12, 12, respectively in the direction shown by the arrows. In each towline 12 is a spring 13 which gives the system 10 freedom to surge in waves. A plurality of serially connected primary weir sections 14 represent the forward end of the system 10 which are connected to the towlines 12, 12 through end floats 16, 16, respectively. Each primary weir section 14 includes a pair of floatation elements 18, 18 respectively between which is located the primary weir opening 20, as shown more clearly in FIG. 5. Intermediate floatation elements 22, 22 separate the primary weir sections 14 from one another.

The rearward end of the system is composed of serially connected secondary weir floats 25 which are connected at their respective ends to the ends of the primary weir sections 14 through the common end floats 16, 16 respectively. The secondary weir sections 25 are symetrically disposed about a centrally located floatation member 26. An oil exhaust connector 28 is attached to each secondary weir section 25 and to a common pair of manifolds 30, 30 from which the exhausted oil is passed through conduits 32, 32 respectively into a common suction line 34. Alternatively, a single manifold 30 may be used and the floatation member 26 may in addition represent another secondary weir.

A flexible sheet 36 interconnects the primary weir sections 14, to the secondary weir sections 25 to form the collection basin interior with the sheet 36 defining the bottom of the basin. The spacing between primary and secondary weirs is held relatively constant by means of stiffeners 38 connecting the intermediate floatation elements 22 to alternate the secondary weir sections 25.

The basin bottom 36 is constructed of a material selected on the basis of strength, flexibility and compatibility with an environment of salt water and crude oil. A preferred oil resistant material meeting the above requirements is made from fiber reinforced laminates of nylon reinforced synthetic, natural rubber, nylon reinforced vinyl and urethane.

A plurality of apertures 40 in the form of rectangular slots are provided in the basin bottom 36 preferably at a low pressure region about three inches aft of the bottom centerline. The apertures 40 function as passive water exhaust slots, i.e., requiring no pumping action to drain water from the interior of the basin during the oil recovery operation as will be explained in greater detail hereafter in connection with the operation of the system.

To conform the geometry of the system to that of a parabolic configuration, which would otherwise be assumed in a current, all of the forward floatation elements are connected through bridle lines 42 to an external tension line 44 which is designed to take the loads imposed on the system by waves and currents. This prefabrication in a parabolic form minimizes stresses and allows all bridle lines 42 to be taut and carry a roughly equal load, which stabilizes the system and improves its performance. The hydrodynamic loads and external loading are transmitted to the external tension line 44 via the bridles 42 or through the end floats 16, 16 respectively which are also connected to the tension line. The external tension line 44 is in turn connected at its opposite ends to each tow line 12 respectively and is preferably constructed of a synthetic cordage such as polypropylene or nylon and/or dacron.

Figure 5:
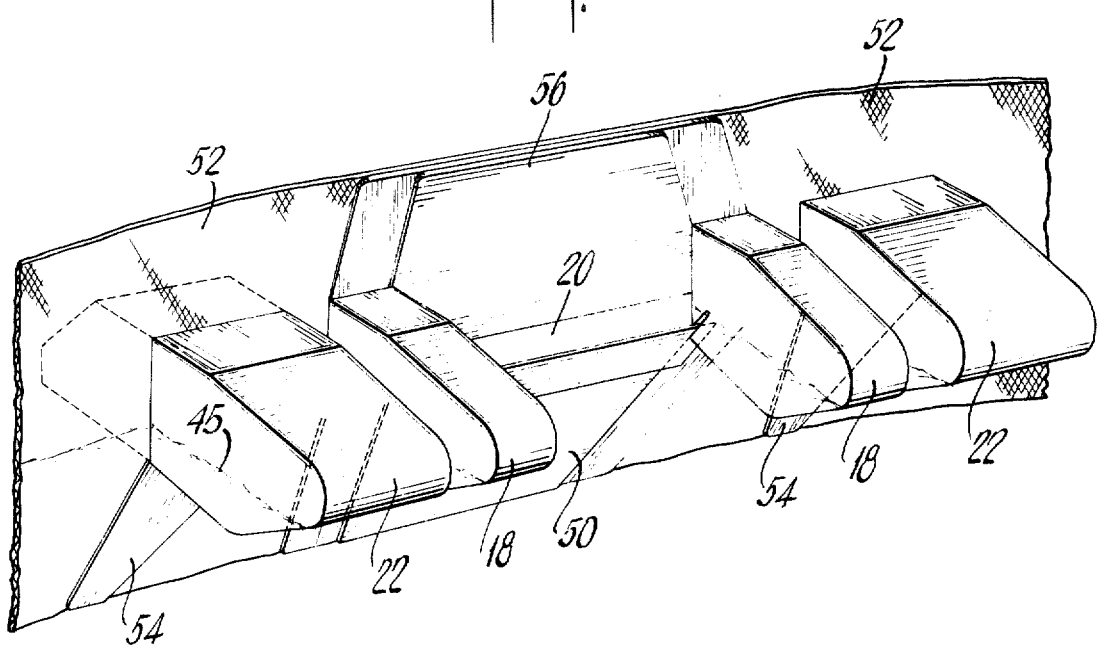
FIG. 5 is a developed view of a primary weir section of FIGS. 1 and 3.

The details of construction of each primary weir section 14 are shown in FIG. 5. The primary weir opening 20 which allows oil to enter the basin is located partially above and partially below the approximate waterline 45 at the primary weir floatation elements 22. Below the weir opening 20 extends an angled weir plate 50. The weir plate 50 is supported by the weir floatation elements 22 and is maintained in a desired orientation with respect to the vertical axis of the system, of between 0° to 75° preferably at 45° of normal, by means of further bridle lines 42 (shown in FIG. 4) which are also connected to the tension line 44. The angled weir plate 50 extends a predetermined vertical distance of about two feet below the water surface to prevent oil from running under the weir. A flexible skirt of preferably the same material as the sheet 36 forming the basin bottom interconnects the primary weir sections 14 to each other and to the intermediate floatation elements 22. The skirt 52 is stiffened beneath the intermediate floatation elements with plates 54 to prevent excessive skirt deflection. The skirt 52 prevents oil from running under the system between weirs and also extends above the system to function as a wind breaker and splash guard. A stiff splash guard plate 56 is located directly above each weir opening 20 to prevent oil and water from splashing over the weir into the basin. The angled weir plate 50, splash guard plate 56, and skirt stiffener plates 54 may be made of a light weight thermoplastic or fiber reinforced thermoset plastic material such as polyvinyl chloride.

Each secondary weir section 25 as shown in FIG. 4 comprises a secondary weir floatation element 60 and a trough 62, in the form of a "U" shaped channel, which lies in the interior of the basin. The open lip 64 of the trough 62 is located beneath float 25 close to the surface of the basin, i.e., close to sea level. A discharge port 66 within the trough interior communicates with the oil exhaust connector 28 for passing oil out from the interior of the basin as will be explained hereafter. Mesh screen may be placed over the trough opening 64 to prevent debris from passing out with the oil. A splash guard 68 may be used to prevent oil from splashing out of the system. The splash guard 68 may be connected to the splash guard of each other secondary weir section 25 in a similar manner and constructed in a similar fashion to the splash guards associated with the primary weir section 14. The trough 62 and splash guard 68 may be formed as one unit as shown in FIG. 4 with the splash guard 68 extending through and connected to the floatation element 60.

All of the floatation elements 18, 22, and 60 respectively are constructed of semiflexible, closed cell polyethylene foam with an oil and abrasion-resistant urethane elastomer outer coating. Alternatively the floatation elements may be constructed of a vacuum formed vinyl or ABS sheeting with a rigid foam core; or of a combustion of the above materials. The floatation elements are all preferably composites of discrete foam sections which are joined together rather than continuous foam members. The shapes and sizes of the floatation elements are designed to meet the following requirements: (a) to partially compensate for the moment on each primary weir respectively due to drag on the weir plate when being towed; (b) to prevent the weirs from planing under when being towed; (c) to compensate for the effect of the negative velocity pressures; and (d) to provide the proper waterplane area for maintaining the desired heave material period.

OPERATION OF THE SYSTEM

The operation of the system can be seen by reference to FIG. 2. The entire system 10 as seen in FIG. 1 is towed through a slick 70 of low density fluid, hereinafter referred to as oil, on top of a higher density fluid hereinafter referred to as water. The relative motion between the oil and primary weir sections 14 causes a pile-up or thickening of the oil immediately in front of each primary weir-plate 50. This thickening is maintained at a high level without local thinning by angling the primary weir-plate 50 away from the oil pile-up area. The oil 70 flows through the weir openings 20 bounded by the primary weir floatation elements 18 and the upper surface of the primary weir-plate 50. Forward motion of the system 10 as well as the pile-up effect of the slick causes a dynamic velocity head to be built up. This dynamic head causes oil to flow through the primary weir openings 20 into the recovery basin 36. In the recovery basin 36 the oil 70 further thickens due to the reduced pressure under the streamlined basin bottom 36. The reduced pressure under the basin is caused by the augmented velocity under the basin in accordance with Bernoulli's principle. From this thick oil pool the oil flows over the secondary weir 62, through the discharge port 66, oil exhaust connector 28 into manifold 30 and thence is exhausted by pumps (not shown) through line 34. Since weir 62 is positioned beneath float 25, ther is no free surface in the oil above the weir. This prevents entrainment of air into the withdrawn oil when the apparatus is used in rough seas. Since the oil within the interior of the basin is relatively deep, with adequate residence time provided in the basin for water to settle out, little or no water passes over the trough 62, and the system operation is relatively unaffected by waves. Residence time is defined as the volume of liquid in the basin divided by the flow rate of liquid passing out of the basin. The higher capacity version of the system partially shown in FIG. 3 is designed for an average volume of 3,500 gallons and a flow rate of 2,000 gal/min and as such has a residence time of about 1 ¾ minutes.

Any water carried through the primary weir openings 20 with the oil settles to the bottom of the basin due to gravity and is exhausted out the basin bottom through slots 40. The oil settles to the surface due to gravity and is exhausted over the secondary weir. The level of the oil-water interface in the basin is established by the pressure acting on the basin bottom and water is discharged at a rate to maintain this level. Thus no oil passes out of the slots 40. In addition to passively exhausting the water, the slots 40 serve to equalize the pressure inside and outside of the basin and thus prevent weir immersion with increased speed. Moreover, the slots 40 prevent large membrane stresses from building up in the basin fabric. The slots 40 also make launch and recovery for the system somewhat simpler since the water in the basin interior can drain out freely.

The use of discrete floating elements connected by a flexible skirt makes the apparatus highly conformable to waves so that oil neither breaks over or passes under the barriers established by the primary weir or the secondary floats supporting the rearward edge of the basin.

The operation in waves is further improved because the primary weir floatation elements partially act as a breakwater for incoming waves and prevents them from substantially disturbing the oil-water interface in the basin. This, combined with the low flow velocities in the basin and the relatively long settling time for the oil/water mixture in the basin, results in the high recovery efficiency.

It should be understood that the system 10 as hereinabove described is compatible in use with conventional oil confinement barriers which may be interposed between the towlines 12 and floatation elements 16 when necessary to funnel oil to the system.

We claim:

1. Apparatus for collecting an immiscible liquid such as oil spread on a body of water, including a basin with a flexible sheet bottom, said basin being supported by floatation to maintain its rearward edge above the water line, a primary weir attached to the forward edge of said basin and supported by floatation, and oil withdrawal means for drawing oil from said basin, said primary weir having weir openings therein for passage of liquid from the upper layer of said body of water into said basin, said apparatus having a plurality of rigid sections positioned along said primary weir with spaces between adjacent sections, each section including a rearwardly and downwardly sloping rigid weir plate and floatation affixed thereto said flexible sheet being attached to said sections and extending upwards between said sections to a level above said weir plates, said flexible sheet bridging said spaces between said sections and barring flow past said primary weir between said weir plates while making said primary weir conformable to wave motion in said body of water.

2. Apparatus as claimed in claim 1, wherein the rear edge of said basin is supported by discrete secondary floats spaced along the rear edge of the basin and connected by flexible sheet.

3. Apparatus as claimed in claim 2, having stiff members connected between said primary weir and said secondary floats, maintaining the spacing therebetween.

4. Apparatus as claimed in claim 3, wherein said oil withdrawl means includes a plurality of secondary weirs supported on said secondary floats, each secondary weir having a lip positioned beneath its associated secondary float, each said lip and associated float providing an entry over said lip for fluid flowing without free surface, thereby admitting fluid from the upper layer of fluid within said basin to an oil discharge without air entrainment.

5. Apparatus as claimed in claim 2, having a tension line rigged foreward of said primary weir and a plurality of bridles running between said tension line and said primary weir, whereby said primary weir may be towed over said body of water with preponderance of towing forces carried by said tension line.

6. Apparatus as claimed in claim 5, wherein said bridles are proportioned in length to deploy said primary weir along a parabolic line.

7. Apparatus as claimed in claim 1, wherein said primary weir includes a plurality of discrete floats intermediate to said weir plates and connected thereto by flexible sheet.

8. Apparatus as claimed in claim 7, wherein said floats are made of a semiflexible closed cell foam coated with an elastomer outer coating.

9. Apparatus as claimed in claim 7, wherein said intermediate floats have rigid stiffening plates affixed thereto and attached to the forward edge of said basin, sais stiffening plates extending downward from said intermediate floats to maintain said basin bottom at a predetermined depth in the water.

10. Apparatus for collecting an immiscible liquid, such as oil, spread on a body of water, including a basin with a flexible sheet bottom said basin being supported by floatation to maintain its rearward edge above the water line, a primary weir attached to the forward edge of said basin and supported by floatation, and oil withdrawal means for drawing oil from said basin, said primary weir having weir openings therein for passage of liquid from the upper layer of said body of water into said basin, said primary weir having a plurality of rigid modules disposed therealong in spaced relationship with one another, said flexible sheet connecting adjacent modules and providing a barrier to flow between modules, each module comprising two spaced, weir floats elongated in the fore-aft direction with a weir plate affixed therebetween with the weir lip extending generally across the space between the weir floats, and with the plane of the weir plate at an acute angle to the long dimension of the weir floats, the module floating stably with the weir plate inclined into the water, its lip being forward and higher, thereby causing as the apparatus moves over the body of water a thickening of the oil ahead of the weir plate and a reduced pressure beneath said basin.

11. Apparatus as claimed in claim 10, wherein the bottom of said basin has a perforation therein, whereby water is discharged from the basin at a low pressure region.

* * * * *